US012760578B2

(12) United States Patent
Janneck et al.

(10) Patent No.: US 12,760,578 B2
(45) Date of Patent: Oct. 13, 2026

(54) DOOR DRIVE DEVICE HAVING A SENSOR APPARATUS FOR MEASURING A FORCE IN THE FORCE FLOW

(71) Applicant: BROSE FAHRZEUGTEILE SE & CO. KOMMANDITGESELLSCHAFT, BAMBERG, Bamberg (DE)

(72) Inventors: Martin Janneck, Bamberg (DE); Nadja Becker, Bamberg (DE); Tobias Gagel, Zapfendorf (DE); Daniel Schnapp, Ebensfeld (DE); Matthias Geier, Bamberg (DE); Maximilian Kunzelmann, Bamberg (DE)

(73) Assignee: BROSE FAHRZEUGTEILE SE & CO. KOMMANDITGESELLSCHAFT, BAMBERG, Bamberg (DE)

( * ) Notice: Subject to any disclaimer, the term of this patent is extended or adjusted under 35 U.S.C. 154(b) by 222 days.

(21) Appl. No.: 18/685,482

(22) PCT Filed: Aug. 22, 2022

(86) PCT No.: PCT/EP2022/073295
§ 371 (c)(1),
(2) Date: Apr. 23, 2024

(87) PCT Pub. No.: WO2023/025710
PCT Pub. Date: Mar. 2, 2023

(65) Prior Publication Data

US 2024/0352780 A1 Oct. 24, 2024

(30) Foreign Application Priority Data

Aug. 23, 2021 (DE) ..................... 10 2021 121 798.9

(51) Int. Cl.
*E05F 15/41* (2015.01)
*E05F 15/611* (2015.01)
(Continued)

(52) U.S. Cl.
CPC ............ *E05F 15/41* (2015.01); *E05F 15/611* (2015.01); *E05F 15/616* (2015.01);
(Continued)

(58) Field of Classification Search
CPC ....... E05F 15/41; E05F 15/611; E05F 15/616; E05F 15/622; E05Y 2400/44;
(Continued)

(56) References Cited

U.S. PATENT DOCUMENTS 3,398,484 A 8/1968 Katsumura et al.
6,378,392 B1 4/2002 Dombrowski et al.
(Continued)

FOREIGN PATENT DOCUMENTS

CN 2396166 Y 9/2000
CN 101379262 A 3/2009
(Continued)

OTHER PUBLICATIONS

ISA European Patent Office, International Search Report Issued in Application No. PCT/EP2022/073295, Dec. 2, 2022, WIPO, 4 pages.
(Continued)

*Primary Examiner* — Justin B Rephann
(74) *Attorney, Agent, or Firm* — McCoy Russell LLP

(57) ABSTRACT

It is provided a door drive device for adjusting a vehicle door relative to a vehicle body comprising an adjustment part, which can be adjusted in an adjustment direction, for transmitting force between the vehicle door and the vehicle body, a drive motor, a gear assembly which couples the drive motor to the adjustment part, and a gear housing which at
(Continued)

least partially encloses the gear assembly. An adapter element is connected to the gear housing for fastening the door drive device to the vehicle door or the vehicle body. A sensor apparatus is used to determine a measured value which indicates a force between the vehicle door and the vehicle body.

11 Claims, 11 Drawing Sheets

(51) Int. Cl.
*E05F 15/616* (2015.01)
*E05F 15/622* (2015.01)

(52) U.S. Cl.
CPC ......... *E05F 15/622* (2015.01); *E05Y 2400/44* (2013.01); *E05Y 2900/531* (2013.01)

(58) Field of Classification Search
CPC ......... E05Y 2400/3015; E05Y 2400/32; E05Y 2400/33; E05Y 2900/531
See application file for complete search history.

(56) References Cited

U.S. PATENT DOCUMENTS

| | | | | |
|---|---|---|---|---|
| 6,814,392 | B1 | 11/2004 | Tomaszewski | |
| 6,877,791 | B2 * | 4/2005 | Greuel | E05F 15/70 296/146.4 |
| 9,534,436 | B2 | 1/2017 | Osafune | |
| 9,650,824 | B2 * | 5/2017 | Sauerwein | E05F 5/00 |
| 10,041,281 | B1 * | 8/2018 | Miu | E05C 17/006 |
| 10,208,516 | B2 * | 2/2019 | Miu | E05C 17/006 |
| 10,344,516 | B2 * | 7/2019 | Sauerwein | E05F 15/70 |
| 10,352,080 | B2 | 7/2019 | Rietdijk | |
| 10,669,756 | B2 * | 6/2020 | Miu | E05F 15/622 |
| 11,634,939 | B2 * | 4/2023 | Battlogg | B60Q 1/324 701/49 |
| 2003/0030299 | A1 * | 2/2003 | Cleland | E05F 15/41 296/146.8 |
| 2003/0079413 | A1 | 5/2003 | Fukumoto et al. | |
| 2003/0085589 | A1 | 5/2003 | Oberheide | |
| 2003/0196382 | A1 | 10/2003 | Yokota | |
| 2004/0113456 | A1 | 6/2004 | Greuel et al. | |
| 2005/0022453 | A1 | 2/2005 | Bosio | |
| 2009/0133844 | A1 | 5/2009 | Kriese et al. | |
| 2009/0217596 | A1 | 9/2009 | Neundorf et al. | |
| 2009/0314111 | A1 | 12/2009 | Schunke | |
| 2010/0139428 | A1 | 6/2010 | Roither et al. | |
| 2012/0000304 | A1 * | 1/2012 | Hamminga | E05F 15/622 74/89.23 |
| 2015/0033885 | A1 | 2/2015 | Kristen | |
| 2015/0256048 | A1 | 9/2015 | Ohta et al. | |
| 2015/0300071 | A1 | 10/2015 | Osafune | |
| 2016/0312513 | A1 | 10/2016 | Heydel et al. | |
| 2017/0030135 | A1 * | 2/2017 | Elie | E05F 15/73 |
| 2017/0260790 | A1 * | 9/2017 | Sauerwein | E05C 17/22 |
| 2018/0155968 | A1 | 6/2018 | Miu et al. | |
| 2018/0202203 | A1 * | 7/2018 | Miu | E05F 5/00 |
| 2018/0283062 | A1 * | 10/2018 | Miu | E05C 17/003 |
| 2019/0063490 | A1 | 2/2019 | Sakiyama | |
| 2020/0232262 | A1 | 7/2020 | Marlia | |
| 2020/0340282 | A1 * | 10/2020 | Sproule | F16D 28/00 |
| 2020/0386037 | A1 * | 12/2020 | Battlogg | E05F 15/41 |
| 2021/0238907 | A1 | 8/2021 | Tang et al. | |
| 2022/0307314 | A1 | 9/2022 | Schnapp et al. | |
| 2024/0352780 | A1 * | 10/2024 | Janneck | E05F 15/622 |

FOREIGN PATENT DOCUMENTS

| | | | |
|---|---|---|---|
| CN | 101432159 | A | 5/2009 |
| CN | 104662245 | A | 5/2015 |
| CN | 105089413 | A | 11/2015 |
| CN | 106066113 | A | 11/2016 |
| CN | 109281568 | A | 1/2019 |
| DE | 19623317 | A1 | 12/1997 |
| DE | 19749668 | A1 | 6/1998 |
| DE | 60305373 | T2 | 11/2006 |
| DE | 102008061120 | A1 | 6/2010 |
| DE | 102015215627 | A1 | 2/2017 |
| DE | 102016223667 | A1 | 5/2018 |
| DE | 102017123483 | A1 | 4/2019 |
| DE | 102019211932 | A1 | 2/2021 |
| EP | 1354739 | B1 | 5/2006 |
| EP | 1545269 | B1 | 6/2010 |
| EP | 2087258 | B1 | 1/2011 |
| EP | 2027401 | B1 | 10/2011 |
| EP | 2196699 | B1 | 2/2013 |
| JP | 2704592 | B2 | 1/1998 |
| JP | 2009155900 | A | 7/2009 |
| JP | 2013014996 | A | 1/2013 |
| WO | 02084061 | A1 | 10/2002 |
| WO | 2018002158 | A1 | 1/2018 |
| WO | 2018098594 | A1 | 6/2018 |
| WO | 2018145883 | A1 | 8/2018 |
| WO | 2020113983 | A1 | 6/2020 |

OTHER PUBLICATIONS

United States Patent and Trademark Office, Non-Final Office Action Issued in U.S. Appl. No. 17/633,603, Jul. 5, 2024, 35 pages.
China National Intellectual Property Administration, Request for Invalidation Issued in Application No. 202080053984.3, Jul. 30, 2024, 206 pages.
United States Patent and Trademark Office, Non-Final Office Action Issued in U.S. Appl. No. 17/633,603, Apr. 28, 2025, 22 pages.

* cited by examiner

DOOR DRIVE DEVICE HAVING A SENSOR APPARATUS FOR MEASURING A FORCE IN THE FORCE FLOW

CROSS REFERENCE TO RELATED APPLICATIONS

The present application is a U.S. National Phase of International Application No. PCT/EP2022/073295 entitled "DOOR DRIVE DEVICE HAVING A SENSOR APPARATUS FOR MEASURING A FORCE IN THE FORCE FLOW," and filed on Aug. 22, 2022. International Application No. PCT/EP2022/073295 claims priority to German Patent Application No. 10 2021 121 798.9 filed on Aug. 23, 2021. The entire contents of each of the above-listed applications are hereby incorporated by reference for all purposes.

BACKGROUND

The proposed solution relates to a door drive device for adjusting a vehicle door relative to a vehicle body.

A door drive device of this kind comprises an adjustment part, which can be adjusted in an adjustment direction, for transmitting force between the vehicle door and the vehicle body, a drive motor, a gear assembly which couples the drive motor to the adjustment part, and a gear housing which at least partially encloses the gear assembly. An adapter element is connected to the gear housing and is used to fasten the door drive device to the vehicle door or the vehicle body. A sensor apparatus is provided to determine a measured value which indicates a force between the vehicle door and the vehicle body.

A door drive device described in DE 10 2015 215 627 A1 comprises an adjustment part in the manner of a rebound strap, which is connected to the vehicle body in an articulated manner and can be adjusted on the vehicle door side by a drive device in order to move the vehicle door relative to the vehicle body in this way. The drive device comprises a winding drum, which can be rotated and is connected to the adjustment part in the form of the rebound strap via a transmission element in the form of a traction cable such that, by rotating the winding drum, the adjustment part can be moved towards the winding drum and the vehicle door can be adjusted thereby.

In a door drive device of this kind, the drive motor can be arranged on the vehicle door side, for example. Here, the adjustment part is coupled to the vehicle body and is also operatively connected to the drive motor such that the adjustment part can be adjusted via the drive motor and a force between the vehicle door and the vehicle body can be brought about thereby for electromotively adjusting the vehicle door relative to the vehicle body. Because the installation space in the vehicle door is limited, for example, a door drive device of this kind should be configured to be compact, such that the door drive device only takes up a comparatively small amount of installation space, for example in a vehicle door.

In a door drive device of this kind, it may be desired that there is motor-assisted, manual adjustment of the vehicle door in so-called servo operation. It is desirable here for the force to be applied by the user to remain at least approximately constant over the adjustment path of the vehicle door irrespective of external influences, such as the vehicle position and weather conditions, and internal influences, such as tolerances and wear, such that a user can adjust the vehicle door with an approximately constant force.

A prerequisite for this kind of motor-assisted adjustment is for the force in the force flow between the vehicle door and the vehicle body to be reliably determined. If the force in the force flow can be reliably and accurately determined, the drive motor can be regulated for electromotively assisting the adjustment such that the force to be applied by the user is approximately constant and an additionally required force is applied by the drive motor.

In the drive device known from DE 10 2017 123 483 A1 for adjusting a tailgate on a motor vehicle, a spindle drive assembly is coupled both to the vehicle body in an articulated manner and to the tailgate in an articulated manner. The spindle drive assembly is configured to be self-locking. A force sensor assembly is used to determine a manual actuation force.

DE 10 2016 223 667 A1 discloses a door drive device for adjusting or fixing a vehicle door relative to a vehicle body which comprises an electromotive drive apparatus in order to establish a force flow between the vehicle door and the vehicle body. A force sensor for generating a measurement signal indicating a force is arranged at a point in the force flow between the vehicle door and the vehicle body. This makes it possible to reliably measure a force when adjusting or fixing the vehicle door.

WO 2018/002158 A1 describes a vehicle door assembly comprising a vehicle door arranged pivotally on a vehicle body and a force transmission apparatus for adjusting and/or fixing the vehicle door relative to a vehicle body. A sensor apparatus in the form of an acceleration sensor arranged on the vehicle door, a gyro sensor or a force sensor generates a sensor signal, which is evaluated by the control apparatus in order to identify a user's desire for adjustment.

SUMMARY

The object underlying the proposed solution is to provide a door drive device that is configured to be compact and at the same time allows for reliable, accurate force measurement in the force flow between a vehicle door and a vehicle body during an adjustment movement of the vehicle door, in particular in order to provide a servo function for motor-assisted adjustment.

This object is achieved by a door drive device having features as described herein.

Accordingly, the sensor apparatus is configured to detect a change in position between the gear housing and the adapter element and/or between the gear housing and a component of the gear assemblies in order to determine the measured value.

In an adjustment movement of the vehicle door relative to the vehicle body, a flow of force between the vehicle door and the vehicle body is established, by means of which an adjustment force is induced in the vehicle door relative to the vehicle body in order to adjust the vehicle door relative to the vehicle body. In the context of a servo function, an adjustment movement of the vehicle door is brought about manually by a user here, wherein the manually conducted adjustment movement is motor-assisted by the drive motor, which is formed by an electric motor, a hydraulic motor or a pneumatic motor, for example, such that a user does not need to apply all of the adjustment force for adjusting the vehicle door. In this case, the drive motor is preferably regulated such that the force applied by the drive motor is measured by means of the sensor apparatus on the basis of a force measurement so that the force to be applied by the user over the adjustment path is approximately constant irrespective of external influences, such as the vehicle position, the temperature or other environmental conditions, and irrespective of internal influences, such as tolerances or wear, and therefore a user always has to apply at least approximately the same force for adjusting the vehicle door.

In order to reliably determine the force acting in the force flow, in the present case the sensor apparatus is arranged and configured such that it measures a measured variable correlated with the force directly in the force flow between the vehicle door and the vehicle body. For example, the sensor apparatus can be arranged and configured such that a change in position between the gear housing and the adapter element is detected in order to draw conclusions on the force in the force flow from the change in position during an adjustment movement. Additionally or alternatively, the sensor apparatus can be arranged and configured to detect a change in position between the gear housing and a component of the gear assembly, for example a guide rail, in order to draw conclusions on the force in the force flow from the change in position of the component, for example the guide rail, relative to the gear housing during an adjustment movement.

The drive device is fixed to the vehicle door or the body by means of the adapter element. Here, the adapter element provides an interface which makes it possible to fasten the drive device to the vehicle door or the vehicle body in a customer-specific manner. The adapter element can be screwed to the vehicle door or the vehicle body, for example, in order to fix the drive device securely and durably to the vehicle door or the vehicle body in this way.

If the door device is to be arranged on the vehicle door, the adapter element is to be fastened to the vehicle door. In this case, the adjustment part is supported on the vehicle body in order to establish a force flow between the vehicle door and the vehicle body. Alternatively, the door drive device can be arranged on the vehicle body and, in this case, is fixed to the vehicle body by means of the adapter element, wherein in this case, the adjustment part is supported on the vehicle door in order to establish a flow of force between the vehicle door and the vehicle body.

Force can for example be measured on the basis of a change in position relative to the adapter element fixed to the vehicle door or the vehicle body. For instance, a change in position of an assembly relative to the adapter element or the gear housing connected to the adapter element can be determined in order to draw conclusions on the force in the force flow from this change in position. By a change in position relative to the adapter element being determined for the force measurement, an assembly that is favorable in terms of installation space is produced in which the sensor apparatus does not contribute to the installation space, or only contributes to it to a negligible extent, and thus does not significantly increase the installation space.

In one embodiment, the gear housing comprises a connection element which is connected to the adapter element. The gear housing is connected to the adapter element by means of the connection element and is thus supported by the connection element. The sensor apparatus is configured to detect a change in position between the connection element and the adapter element in order to determine the measured value.

The connection element forms a bending beam together with the adapter element, for example. For example, the adapter element comprises a first end and the connection element comprises a second end. The first end and the second end are interconnected, preferably interconnected for conjoint rotation, for example by means of a fastening element in the form of a rivet element (e.g. a blind rivet) or a screw, or integrally and in one piece by integrally forming the adapter element together with the connection element. The connection element is therefore connected to the adapter element at one end, but is otherwise free relative to the adapter element and is thus resiliently movable relative to the adapter element, such that force in the force flow can be measured by detecting the change in position of the connection element relative to the adapter element.

The connection element is rigidly connected to the gear housing and can extend in parallel with the planar adapter element, for example, such that the position of the adapter element and the connection element relative to one another can be changed resiliently by the application of force. This results in an assembly in which the connection element can be deflected relative to the adapter element about a defined bending axis in the manner of a spiral spring, for example, the degree of deflection and the deflection direction making it possible to measure the (direction-based) force between the vehicle door and the vehicle body.

In this embodiment, the sensor apparatus is configured as a strain gauge, for example, in order to measure a deformation at the adapter element or the connection element, for example at a transition between the adapter element and the connection element.

In one embodiment, the gear assembly comprises a guide rail that is connected to the gear housing and a sliding element that is guided on the guide rail longitudinally in the adjustment direction, is adjustable by means of the drive motor and is coupled to the adjustment part. For example, the guide rail comprises two legs extending in parallel with one another in the adjustment direction and the sliding element is guided in the adjustment direction between the legs.

In a door drive device of this kind, the drive motor can be arranged to be stationary on the vehicle door, for example. In this case, the guide rail is also connected to the vehicle door and is thus fixed relative to the vehicle door. By contrast, the adjustment part is supported on the vehicle body and can be adjusted on the guide rail by adjusting the sliding element such that the vehicle door is moved relative to the vehicle body.

Alternatively, it is conceivable that the drive motor is arranged to be stationary on the vehicle body side. In this case, the guide rail is fixed relative to the vehicle body, while the adjustment part is supported on the vehicle door, and therefore an adjustment force can be induced in the vehicle door by adjusting the sliding element on the guide rail.

By means of the guide rail, a defined movement path is predetermined for the sliding element. Because the guide rail can be fixed to the associated assembly, for example the vehicle door, in a stationary manner, a compact construction is made possible together with a defined adjustment movement of the adjustment part.

For example, the guide rail comprises two legs, between which the sliding element is guided in a sliding manner. The sliding element thus lies in the guide rail and can be moved between the legs in the adjustment direction in a sliding manner. In one embodiment, the guide rail is formed by a bent panel part, for example. The guide rail is extended longitudinally in the adjustment direction, wherein the legs can be interconnected by a base, for example, such that the guide rail has a U shape or a C shape in cross section transversely to the adjustment direction, for example. A guide channel which predetermines longitudinal guidance for the sliding element along a straight, or potentially also curved, movement path is formed in the guide rail.

The guide rail can be rigidly connected to the gear housing, for example, for example by the guide rail being secured to the gear housing by a flange portion and being connected to the gear housing by means of a screw connection, for example. Alternatively, the guide rail can be overmolded with the material of the guide rail at least in portions, for example, and can thus be materially bonded to the gear housing. As another alternative, the guide rail can also be integrally formed with the gear housing, for example from plastics material.

In one embodiment, the sensor apparatus is configured to detect a change in position between the gear housing and the guide rail in order to determine the measured value. The guide rail thus constitutes a component of the gear assembly to which force is applied during an adjustment movement of the vehicle door and of which the position relative to the gear housing can be changed by the application of force. By detecting the change in position between the gear housing and the guide rail, the force in the force flow between the vehicle door and the vehicle body can thus be measured.

In this embodiment, the sensor apparatus can be configured as an inductive measuring apparatus, for example, and can comprise a coil, which is arranged on the gear housing, for example. A counter element in the form of an electrically conductive panel element can be arranged on the guide rail, for example, which element is associated with the coil and changes its position relative to the coil when there is a change in position of the guide rail relative to the gear housing. By an inductive interaction between the coil and the counter element, the change in position can be detected, for example by evaluation using an inductance-to-digital converter (LDC).

In one embodiment, the guide rail can be resiliently deflected relative to the gear housing transversely to the adjustment direction. The sensor apparatus can determine the deflection of the guide rail relative to the gear housing in order to measure the force in the force flow between the vehicle door and the vehicle body in this way.

The adapter element is arranged on the end face of the guide rail, for example. The adapter element can for example be extended transversely to the adjustment direction and can be formed in the manner of a plate by means of which the drive device is fixed to the associated assembly, i.e. the vehicle door or the vehicle body.

In one embodiment, the adapter element comprises an opening through which the adjustment part extends and in which the adjustment part is movable in the adjustment direction. The adjustment part can be moved longitudinally in the adjustment direction along the guide rail, for example, and as a result is adjusted relative to the adapter element. The adapter element can be fixed to an inner door panel, for example, wherein the drive device is arranged in the door interior space of the vehicle door. The adjustment part extends through the opening in the adapter element out of the door interior space in the direction of the vehicle body and is supported on the vehicle body to establish a force flow between the vehicle door and the vehicle body.

In one embodiment, the sliding element comprises a structural part and a sliding portion arranged on the structural part for being in sliding contact with the guide rail. The structural part serves to provide a stiff structure of the sliding element. By contrast, the sliding portion formed on the structural part serves to improve the sliding properties of the sliding element for sliding in the guide rail.

In one embodiment, the gear assembly comprises a spindle that can be rotated about a rotational axis and can be driven by the drive motor. The sliding element is in a threaded connection to the spindle such that the sliding element can be moved longitudinally in the adjustment direction by rotating the spindle. For example, the spindle comprises an outer thread which is in threaded engagement with an inner thread formed on the sliding element, such that, when the spindle rotates, the sliding element rolls on the spindle and is thus adjusted longitudinally relative to the spindle.

In one embodiment, the sliding element comprises a spindle nut portion comprising a threaded opening formed therein, in which an inner thread is formed in order to establish a threaded connection to the spindle. The spindle engages in the threaded opening and is thus coupled to the spindle nut portion, such that, by rotating the spindle, the sliding element is axially adjustable along the spindle and the adjustment part is thus movable to adjust the vehicle door.

In one embodiment, a gear assembly in the manner of a spindle drive is thus used in the door drive device, by means of which spindle drive adjustment forces can be induced in the adjustment part for adjusting the vehicle door. A spindle drive of this kind can be constructed using a few components in a simple manner and allows for reliable and durable force transmission.

The spindle nut portion of the sliding element is for example formed integrally and in one piece with the sliding portion, for example by means of injection molding in an injection mold. Here, during the injection molding, the threaded opening is also integrally formed with the inner thread formed therein.

By the sliding portion and the spindle nut portion being offset from one another transversely to the adjustment direction, the position of the sliding element relative to the spindle and thus relative to the gear housing can potentially be (slightly) changed by the application of force, and this results in resilient deflection on the guide rail, which can be determined by the sensor apparatus. In particular, the spindle nut portion can be formed on the sliding element above the sliding portion such that the sliding element can potentially tilt relative to the spindle to a certain extent and the guide rail can thus be deflected in a vertical direction relative to the gear housing by a certain distance. This deflection of the guide rail is dependent on the force in the force flow which is produced by the spindle and the sliding element, and therefore conclusions can be drawn on the force in the force flow on the basis of the deflection of the guide rail relative to the gear housing.

In one embodiment, the gear assembly comprises a gear wheel mounted on the gear housing for transmitting force from the drive motor to the spindle. The gear wheel can be configured as a spur gear and can be arranged on the spindle for conjoint rotation, for example. The drive motor can for example comprise a drive shaft and a worm gear which is arranged on the drive shaft and is in toothed engagement with the gear wheel such that a rotational movement of the shaft is converted into a (geared-down) rotational movement of the gear wheel.

The sensor apparatus can generally comprise a strain gauge, an electrical coil or a piezoelectric sensor for detecting the change in position, for example.

An arrangement of one or more strain gauges (which can be interconnected to form a measuring bridge, for example) determines the deformation (elongation or contraction) on a portion of the drive device, for example in the region of the adapter element, wherein the elongation of the strain gauge can be evaluated by an evaluation device.

An electrical coil can interact with an LDC module, for example, in order to evaluate a change in inductance at the coil brought about by a change in position of the coil relative to an associated counter element.

A piezoelectric sensor generates a voltage signal depending on a deformation and can thus likewise be used for force measurement.

Generally, force can be measured by suitable calibration on the basis of the detection of the change in position between the adapter element and the gear housing and/or between the gear housing and a component of the gear assembly, for example the guide rail. The change in position is correlated with and thus dependent on the force in the force flow between the vehicle body and the vehicle door. By means of calibration, for example before the door drive device is put into operation, a conclusion can be drawn on the force in the force flow from the change in position such that force measurement is possible by means of the sensor apparatus.

A door drive device of the kind described can be used as a door drive on a vehicle side door or on a tailgate. A door drive device of the kind described can for example also be used to adjust a bonnet or a so-called frunk (i.e. a lid of a front luggage space of a vehicle), which should also be understood to mean vehicle doors in the context of the present text.

BRIEF DESCRIPTION OF THE DRAWINGS

The concept underlying the solution will be explained in greater detail in the following with reference to exemplary embodiments shown in the drawings.

DETAILED DESCRIPTION

Figure 1:
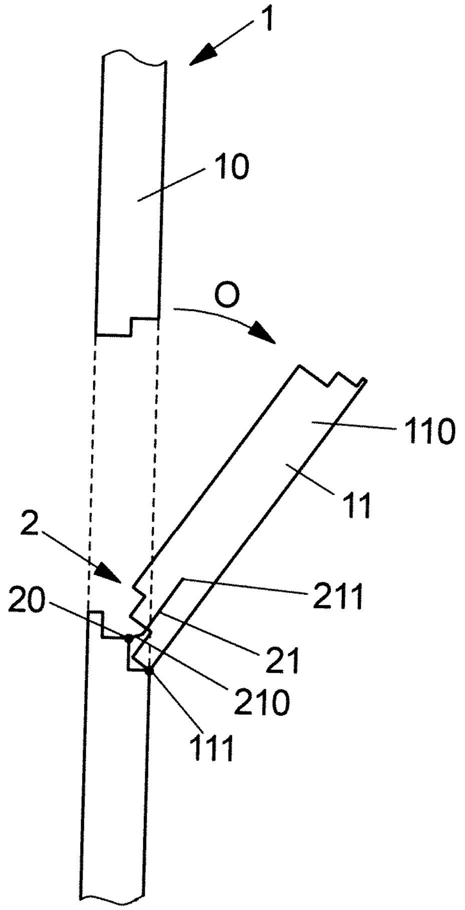
FIG. 1 is a schematic view of a vehicle door on a vehicle body, comprising an adjustment part in the form of a thrust element that is arranged on the vehicle body in an articulated manner and is moved relative to the vehicle door when the vehicle door is pivoted.
Figure 2:
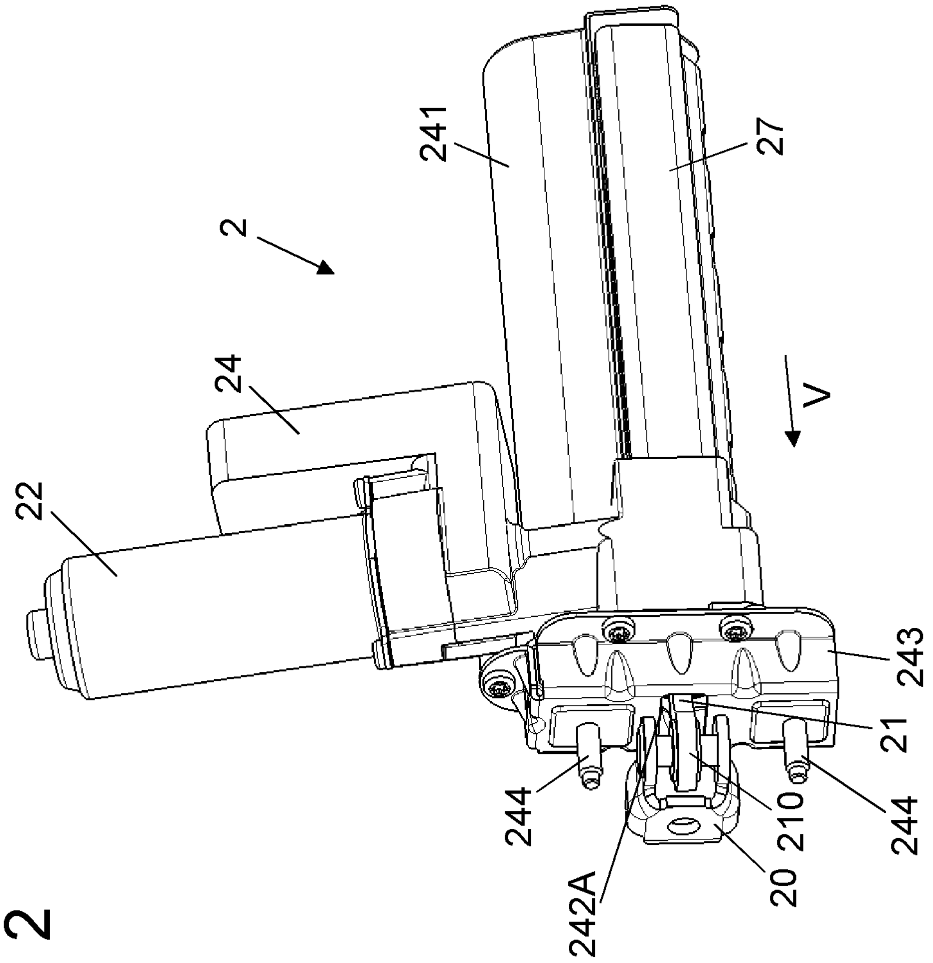
FIG. 2 is a view of an exemplary embodiment of a door drive device for adjusting a vehicle door.

FIG. 1 is a schematic view of a vehicle 1 comprising a vehicle body 10 and a vehicle door 11 which is arranged on the vehicle body 10 so as to be articulated about a door hinge 111 and can be pivoted relative to the vehicle body 10 in an opening direction O in order to open or close a door opening.

A door drive device 2, which comprises an adjustment part 21 in the form of a thrust element and is used to adjust the vehicle door 11 relative to the vehicle body 10, acts between the vehicle body 10 and the vehicle door 11. The adjustment part 21 in the form of the thrust element is arranged so as to be articulated about a joint 20 on the vehicle body 10, for example on the A pillar of the vehicle 1, and moves relative to the vehicle door 11 when the vehicle door 11 is pivoted. Here, one end 211 of the adjustment part 21 projects into a door interior space 110 of the vehicle door 11 and moves in this door interior space 110 when the vehicle door 11 is adjusted.

FIGS. 2 to 19 show views of an exemplary embodiment of a door drive device 2 which serves to adjust an adjustment part 21 and thus to move a vehicle door 11 relative to a vehicle body 10.

In the exemplary embodiment shown, the door drive device 2 comprises an electromotive drive motor 22, which serves to drive a spindle 25 of a gear assembly of the door drive device 2, which spindle can be rotated about a rotational axis D. The drive motor 22 comprises a motor shaft 220 and a worm gear 221 arranged thereon comprising worm gearing, which meshes with a gear wheel 230 in the form of a spur gear of a gear 23.

The gear wheel 230 is arranged on a shaft 233 and is connected to a portion 250 of the spindle 25 via the shaft 233 for conjoint rotation such that the gear wheel 230 is fixed to the spindle 25 for conjoint rotation.

The gear wheel 23 is mounted so as to be rotatable about the rotational axis D of the spindle 25 relative to a gear housing 24 by means of bearings 231, 234. As shown in particular in the partial sectional views according to FIGS. 10 and 11 when considered together with the exploded view according to FIG. 3, a bearing 231 is received in a bearing bush 232 and is supported thereby in a bearing opening 240 in the gear housing 24. By contrast, another bearing 234 lies in a portion 245 of the gear housing 24 and provides support for the shaft 233 on an end of the shaft 233 remote from the bearing 231.

The door drive device 2 comprises a sliding element 26 and a guide rail 27. As shown in particular in the exploded view according to FIG. 3, the guide rail 27 is received in a receiving opening 246 in the gear housing 24 and is rigidly connected to the gear housing 24 by means of flange portions 273.

The sliding element 26 slides in the guide rail 27 such that the sliding element 26 can be adjusted longitudinally on the guide rail 27 in an adjustment direction V. The guide rail 27 has, in the cross section transverse to the adjustment direction V, a C shape, formed by a base 270 and legs 271 extending on the base 270 at an angle to the base 270, the edges 272 of which legs remote from the base 270 are bent such that they point towards one another. The sliding element 26 is guided in the guide rail 27 such that the sliding element 26 is received between the legs 271 and is enclosed at its periphery by the base 270, the legs 271 and the bent edges 272.

In the exemplary embodiment shown, the guide rail 27 is formed as a metal bent panel part and is rigidly connected to the gear housing 24 by means of an adapter element 242 and the flange portions 273 abutting the gear housing 24 (see in particular FIG. 2 and FIGS. 4 to 6). The adapter element 242 is connected to the gear housing 24 by means of fastening elements 243 in the form of screws, wherein the flange portions 273 are interposed, and can be fixed to a structural portion of the vehicle door 11, for example to an inner door panel portion, by means of fastening elements 244 in the form of screws such that the door drive device 2 is fixed in the vehicle door 11.

The adapter element 242 serves to fix the drive device 2 to the vehicle door 11, in particular the inner door panel of the vehicle door 11, such that the drive device 2 is arranged inside a door interior space of the vehicle door 11. The adapter element 242 thus produces an interface, which is adapted in a customer-specific manner and thus makes it possible to attach the drive device 2 to the vehicle door 11 of a particular vehicle model.

The adapter element 242 is arranged on the end face of the guide rail 27 and extends in a planar manner transversely to the adjustment direction V, in which the sliding element 26 together with the adjustment part 21 arranged thereon can be moved towards the guide rail 27. The adjustment part 21 extends through an opening 242A in the adapter element 242, is guided out of the door interior space through the opening 242A and is supported on the vehicle body 10 by means of the joint 20.

Figure 15:
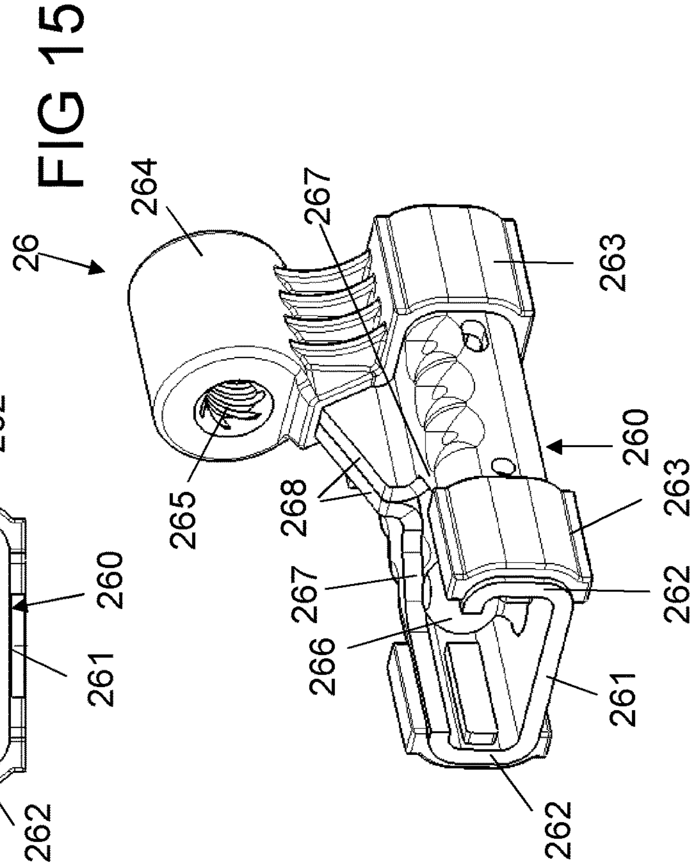
FIG. 15 is a perspective view of the sliding element.
Figure 18:
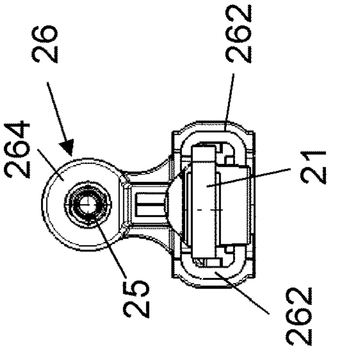
FIG. 18 is an end-face view of the gear assembly.
Figure 16:
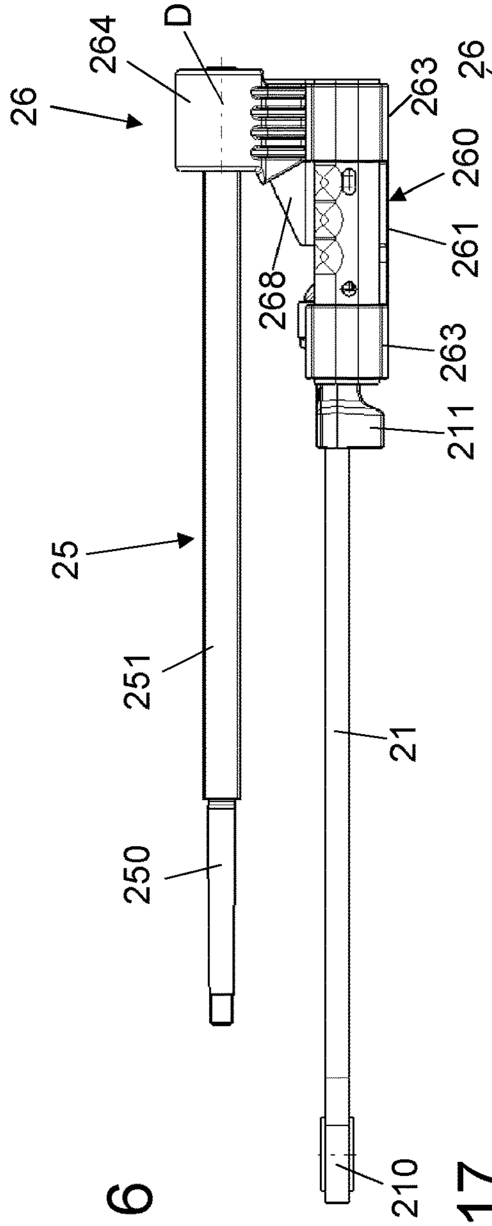
FIG. 16 is a side view of a gear assembly of the door drive device.
Figure 17:
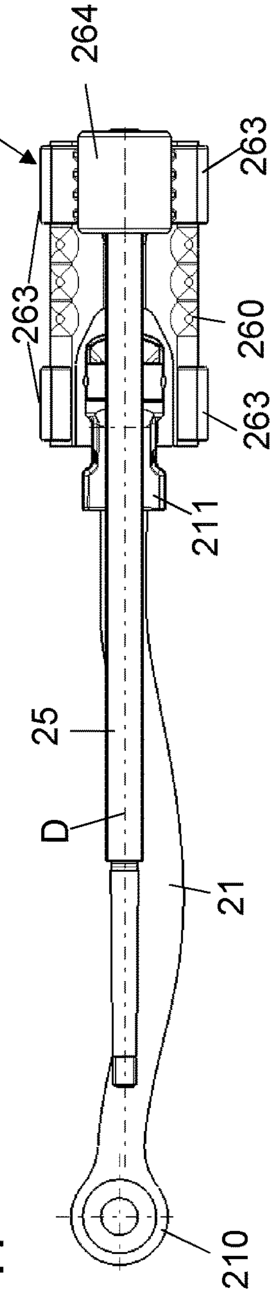
FIG. 17 is a plan view of the gear assembly.
Figure 19:
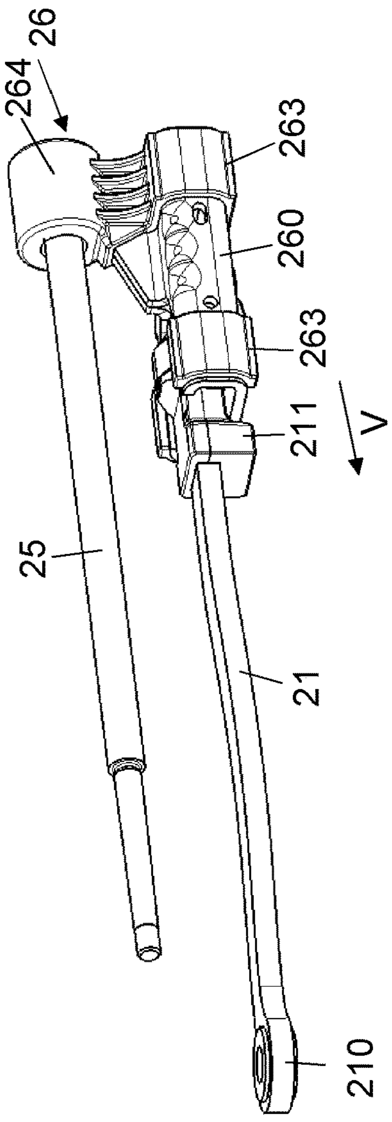
FIG. 19 is a perspective view of the gear assembly.

The sliding element 26 comprises a structural part 260, which is formed as a metal bent panel part and comprises a base 261 and legs 262 angled towards the base 261. Edges 267 of the legs 262 are bent towards one another, wherein portions 268 adjoining the edges 267 are in an upright position such that they point away from the base 261, as shown in FIG. 15, for example.

The structural part 260 is overmolded with plastics material in part, by means of which sliding portions 263 are formed on the outside of the legs 262, by means of which sliding portions the sliding element 26 is in sliding contact with the guide rail 27. A coupling element 266 in the form of a ball head is formed integrally with the sliding portion 263, is arranged between the legs 262 of the structural part 260 and serves to couple the sliding element 26 to the adjustment part 21 in an articulated manner. For this purpose, an end 211 of the adjustment part 21 is arranged on the coupling element 266 and is connected to the sliding element 26 in an articulated manner thereby, as shown by the views of the gear assembly according to FIGS. 16 to 19, for example. Owing to the spherical shape of the coupling element 266, the adjustment part 21 is connected to the sliding element 26 so as to be articulated about the adjustment direction V and also about the axes perpendicular to the adjustment direction V, such that tolerances in the position of the adjustment part 21 relative to the sliding element 26 can be compensated for.

In addition, a spindle nut portion 264 is integrally formed with the sliding portion 263. The spindle nut portion 264 is formed on the upright portions 268 of the structural part 260 and comprises a threaded opening 265 having an inner thread formed therein. The spindle 25 comprising a threaded portion 251 engages in the threaded opening 265, such that the spindle 25 is in threaded engagement with the spindle nut portion 264 of the sliding element 26 by means of an outer thread formed on the outside of the threaded portion 251.

Figure 3:
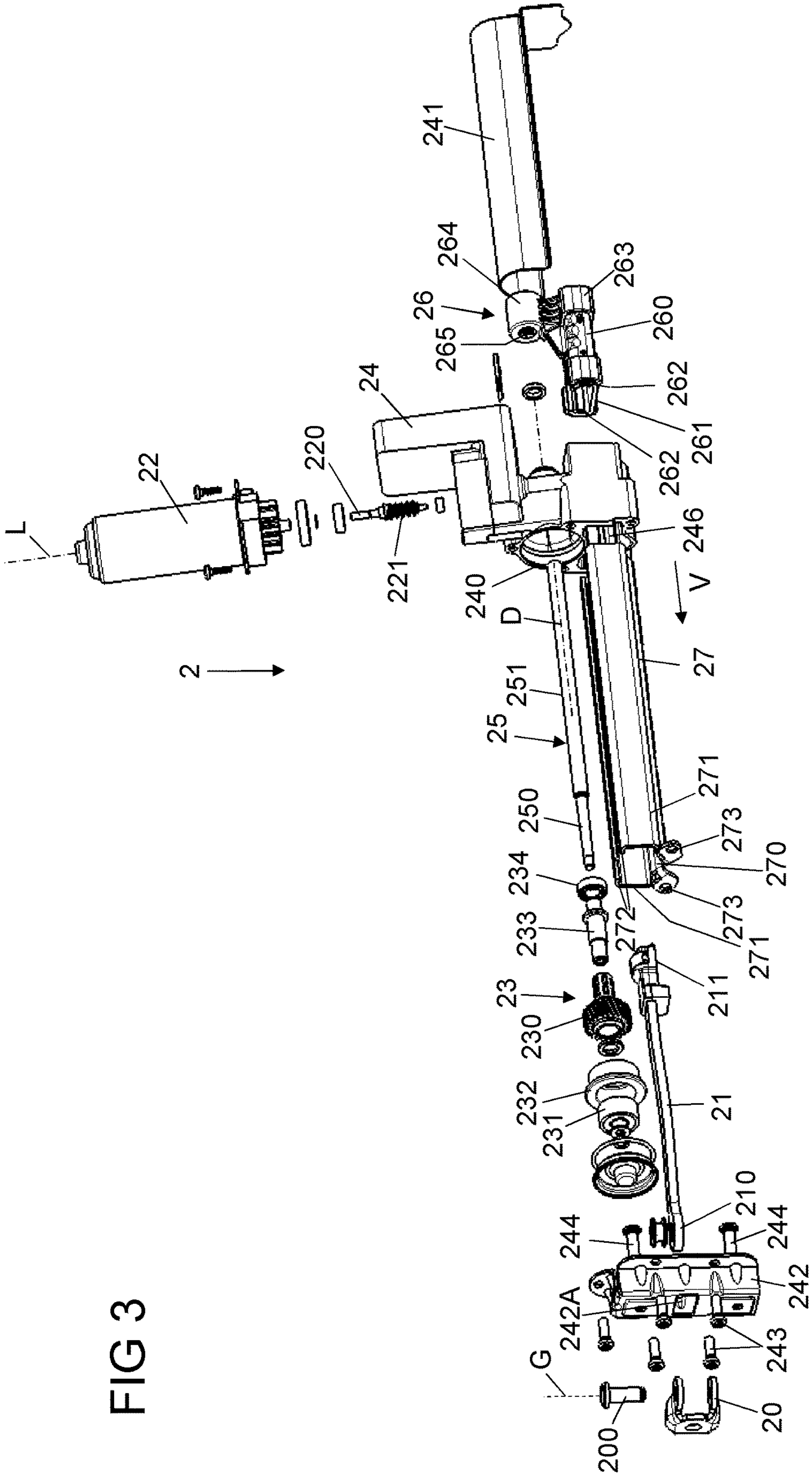
FIG. 3 is an exploded view of the door drive device.
Figure 6:
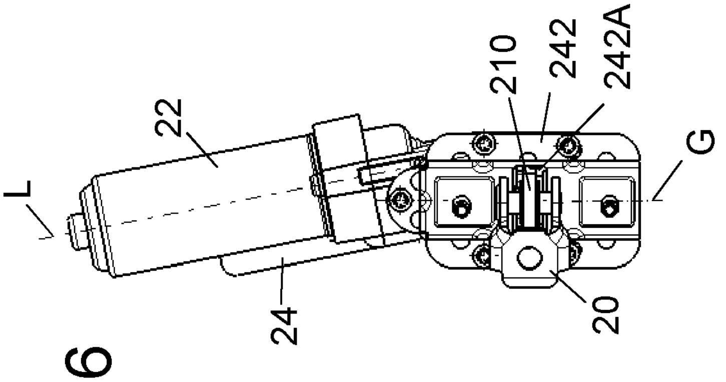
FIG. 6 is an end-face view of the door drive device.
Figure 4:
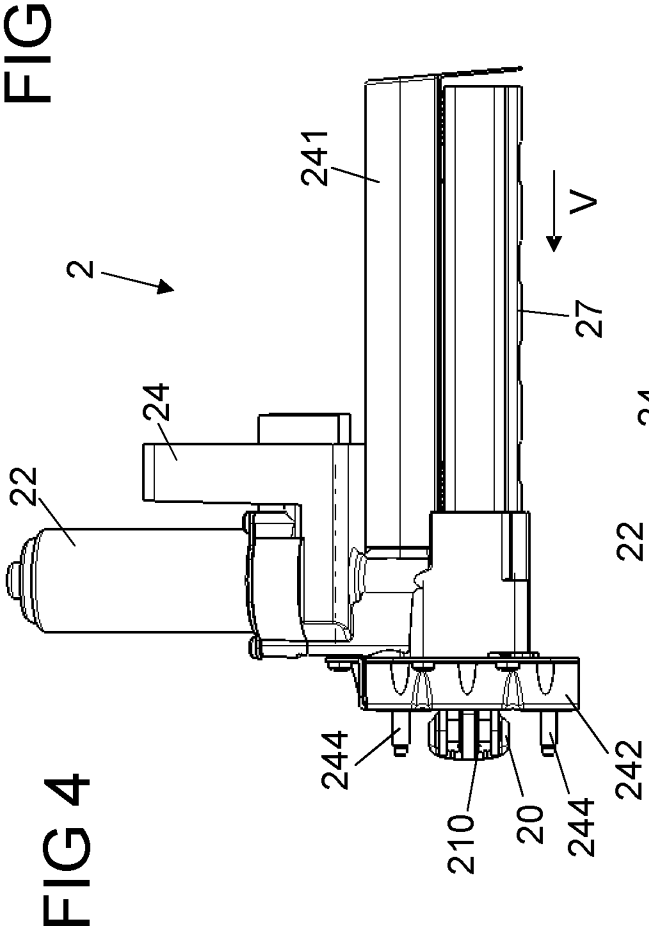
FIG. 4 is another view of the door drive device, from the side.
Figure 5:
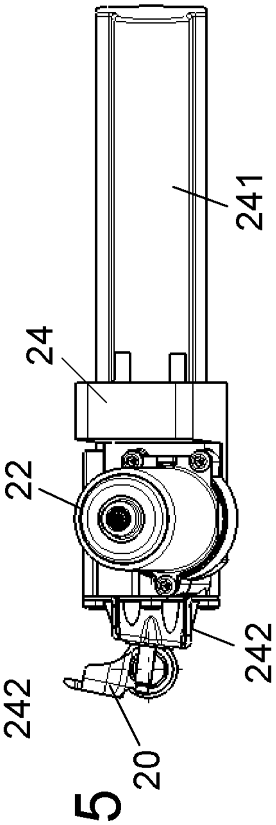
FIG. 5 is a top view of the door drive device.
Figure 10:
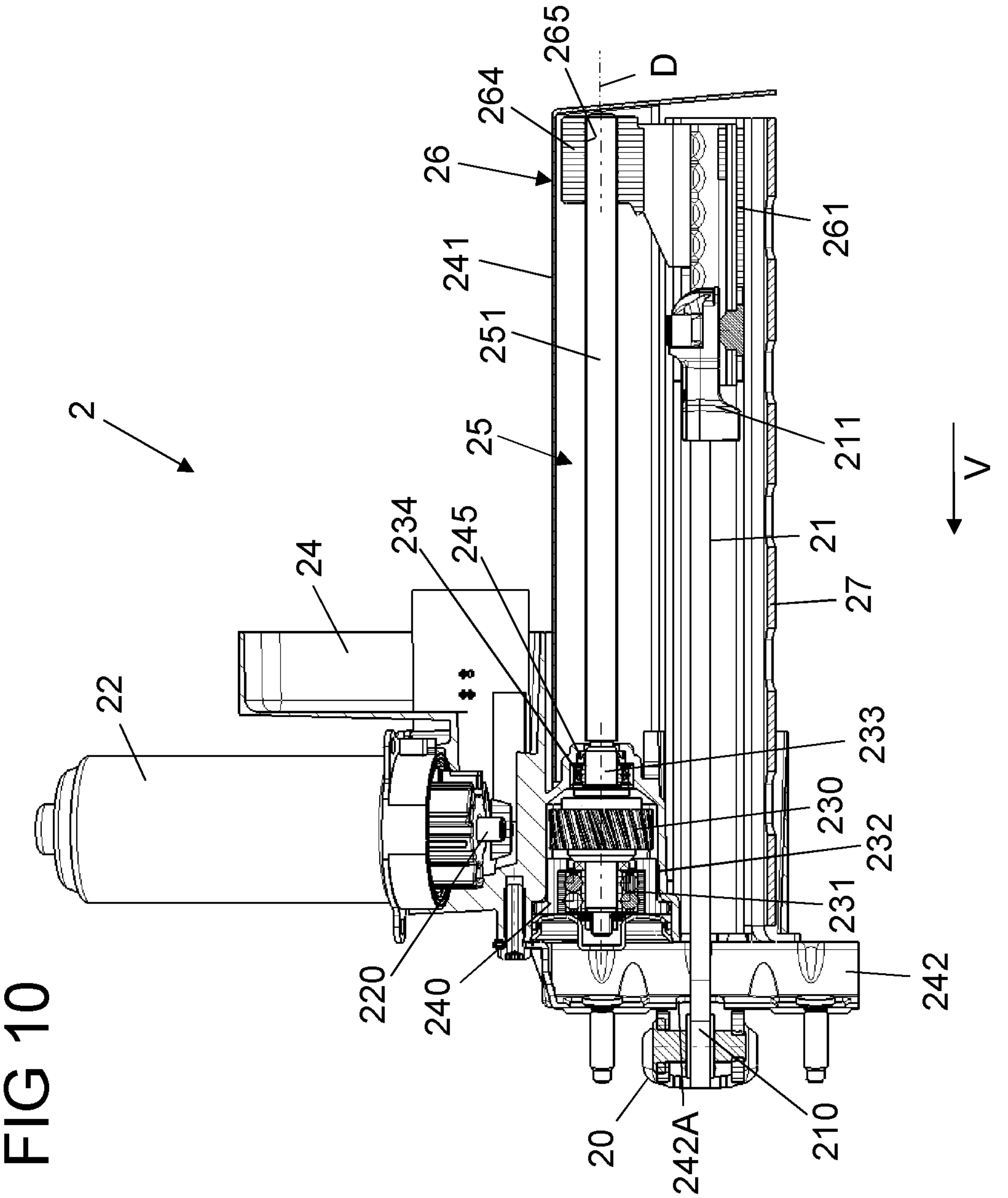
FIG. 10 is a partial sectional view of the door drive device, with the adjustment part retracted.

As shown by FIG. 3 when considered together with FIG. 10, a cover element 241 is arranged on the gear housing 24 which covers the guide rail 27 on the side of the edges 272 and thus encloses the spindle nut portion 264 of the sliding element 26 towards the outside along the movement path predetermined by the guide rail 27.

The adjustment part 21 is coupled at one end 210 to a joint 20 so as to be articulated about a joint axis G by means of a joint pin 200, which joint is rigidly connected to the vehicle body 10, as shown schematically in FIG. 1. The adjustment part 21, however, is coupled to the sliding element 26 in an articulated manner at the end 211 remote from the end 210. By adjusting the sliding element 26, driven by the drive motor 22, the end 211 of the adjustment part 21 can be moved in the guide rail 27 such that the adjustment part 21 can be adjusted between a first, retracted position (FIGS. 4 to 6 and FIG. 10) and a second, extended position (FIGS. 7 to 9 and FIG. 11), in order to move the vehicle door 11 relative to the vehicle body 10 and adjust it between a closed position (corresponding to the retracted position of the adjustment part 21) and an open position (corresponding to an extended position of the adjustment part 21).

As shown in the partial sectional view according to FIG. 10, the sliding element 26 is further away from the gear housing 24 in the first, retracted position and is closer to an end of the guide rail 27 remote from the adapter element 242. In the second, extended position, however, the sliding element 26 is moved towards the gear housing 24 such that the spindle nut portion 264 comes closer to the gear 23 and the end 211 of the adjustment part 21 is moved towards the adapter element 242 in the adjustment direction V.

Figure 11:
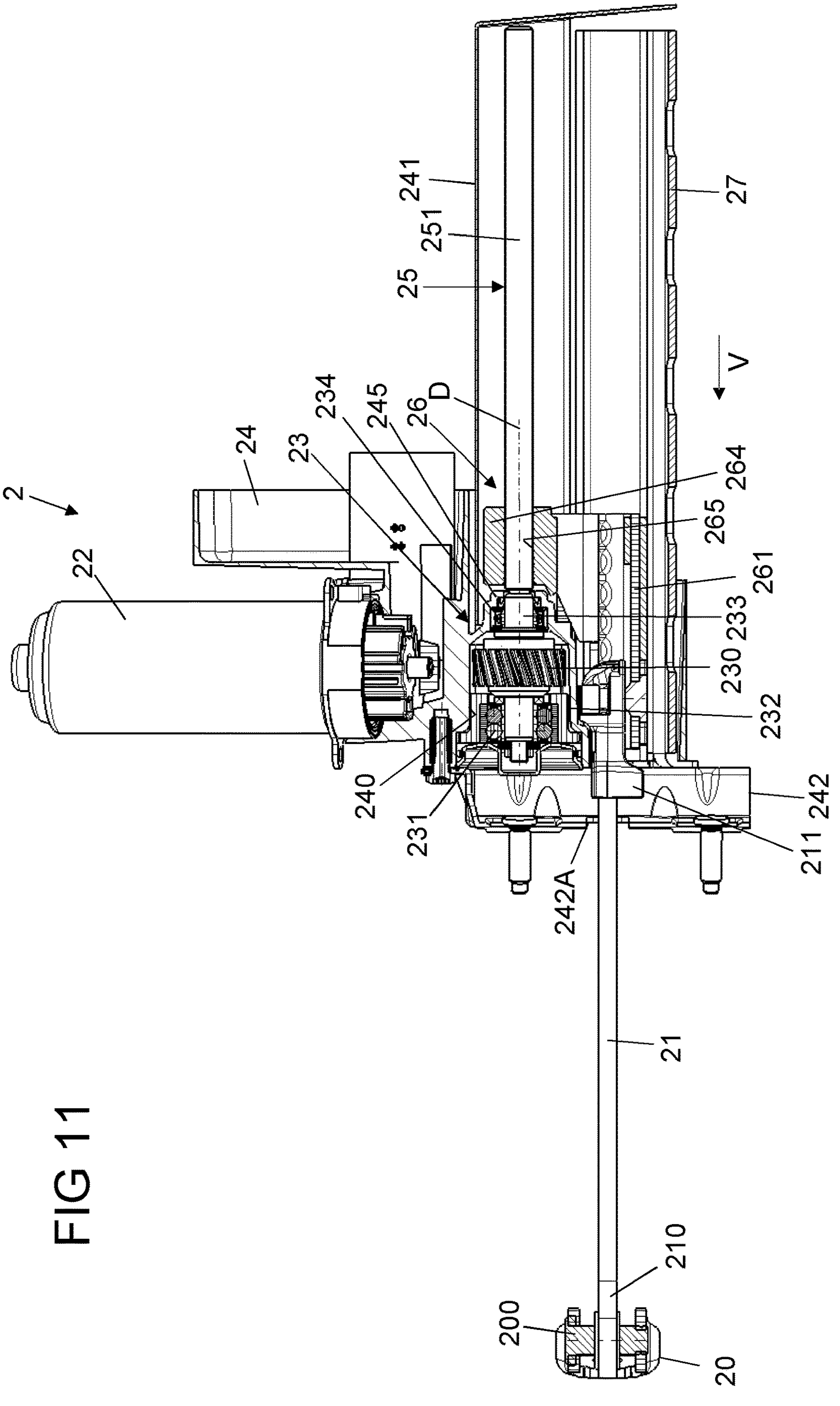
FIG. 11 is the view according to FIG. 10, but with the adjustment part extended.
Figure 12:
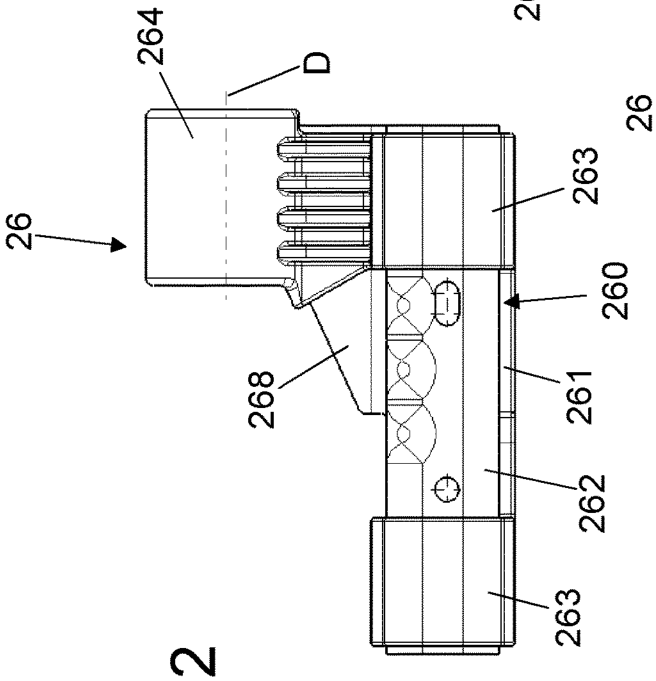
FIG. 12 is a separate side view of a sliding element of a gear assembly of the door drive device.
Figure 13:
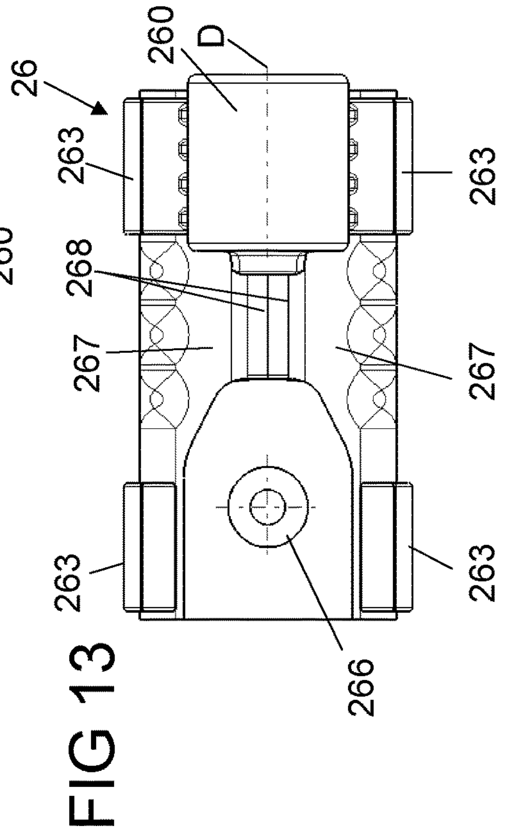
FIG. 13 is a plan view of the sliding element.
Figure 14:
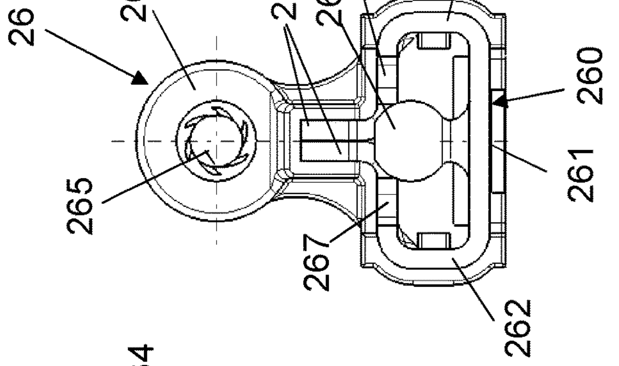
FIG. 14 is an end-face view of the sliding element.

In the second position, the sliding element 26 together with the structural part 260 dips under the gear 23 by the sliding element 26, when viewed in the adjustment direction V, coming into axial overlap with the gear housing 24 and the gear 23 received therein, as shown in FIG. 11. This allows for a construction of the drive device 2 that is efficient in terms of installation space and has a comparatively great amount of travel of the adjustment part 21 in the adjustment direction V and a low installation height transverse to the adjustment direction V, in particular perpendicularly along the joint axis G.

Figure 9:
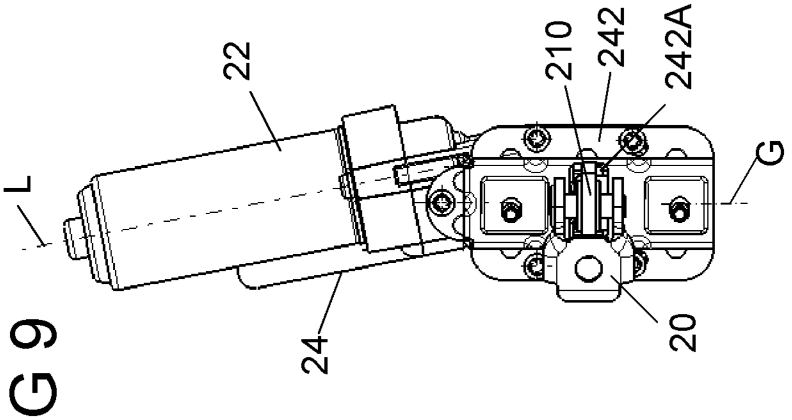
FIG. 9 is the view according to FIG. 6, with the adjustment part extended.
Figure 7:
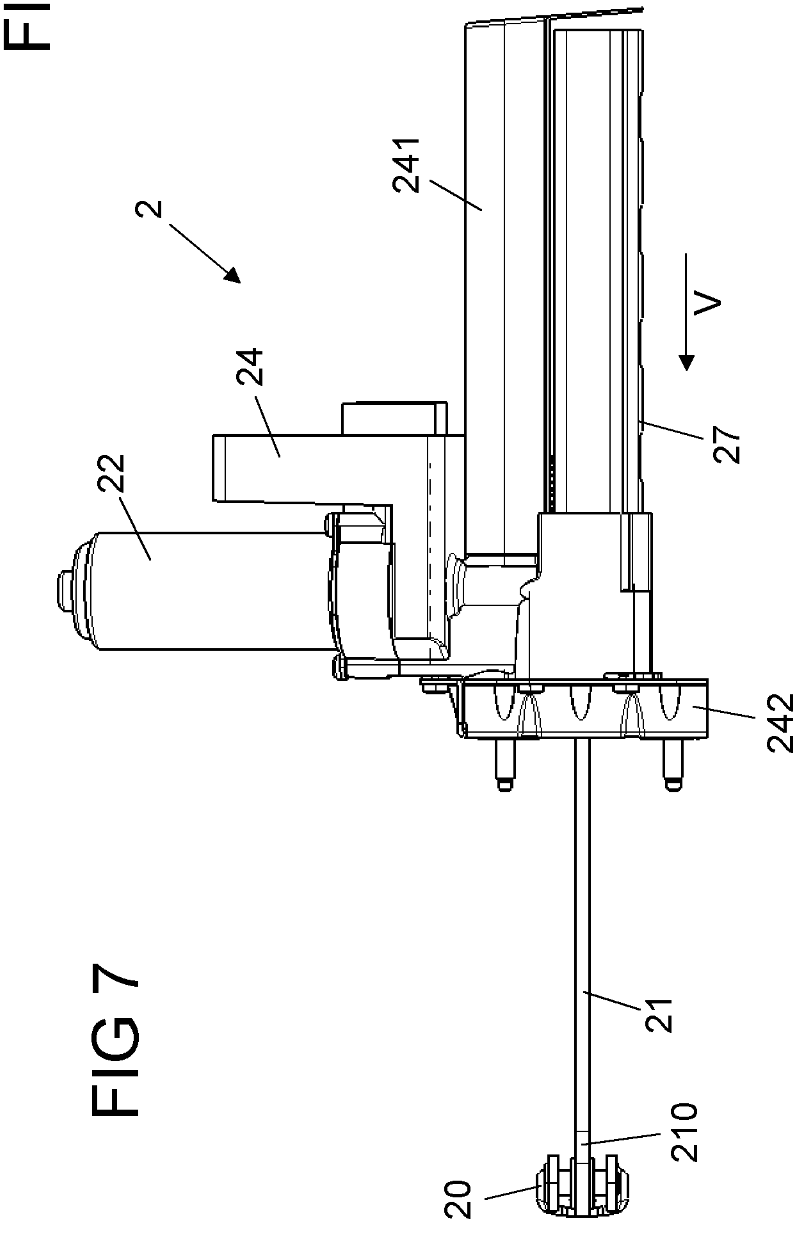
FIG. 7 is the view according to FIG. 4, but with the adjustment part extended.
Figure 8:
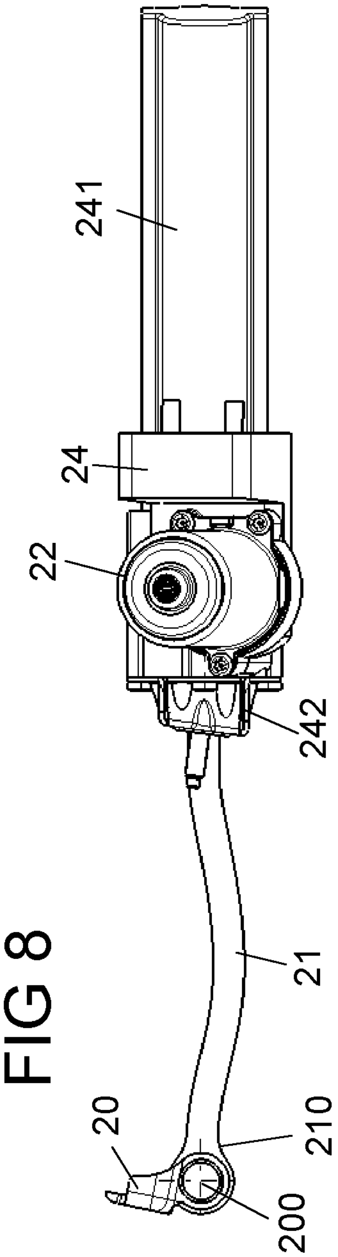
FIG. 8 is the view according to FIG. 5, with the adjustment part extended.

As shown in FIG. 9, a longitudinal axis L about which the motor shaft 22 of the drive motor 22 can be rotated is arranged obliquely to the joint axis G about which the adjustment part 21 is connected to the joint 20 in an articulated manner at the end 210. This can contribute to a saving in terms of installation space, in particular in the transverse direction (transverse to the joint axis G and transverse to the adjustment direction V).

The drive device 2 can be installed in a vehicle door 11 with the drive motor 22 pointing upwards, but alternatively also with the drive motor 22 pointing downwards. Here, the drive motor 22 can also be arranged at an end of the guide rail 27 that is remote from the end of the guide rail 27 at which the adjustment part 21 emerges from the guide rail 27. In this way, the drive device 2 can be used universally on different door models of different vehicles.

In the drive device 2, for adjusting the vehicle door 11 relative to the vehicle body 10, the adjustment part 21 is adjusted by displacing the sliding element 26 on the guide rail 27 in the adjustment direction V by means of the drive motor 22. A force flow arises between the vehicle door 11 and the vehicle body 10 which flows from the vehicle door 11, through the adapter element 242, the gear housing 24, the drive wheel 23, the spindle 25, the sliding element 26 and the adjustment part 21 to the vehicle body 10. For the adjustment, a force is induced in the sliding element 26 by means of the drive motor 22 in this case, and this moves the sliding element 26 on the spindle 25 such that the adjustment part 21 is adjusted and the vehicle door 11 is thus pivoted relative to the vehicle body 10.

Figure 20:
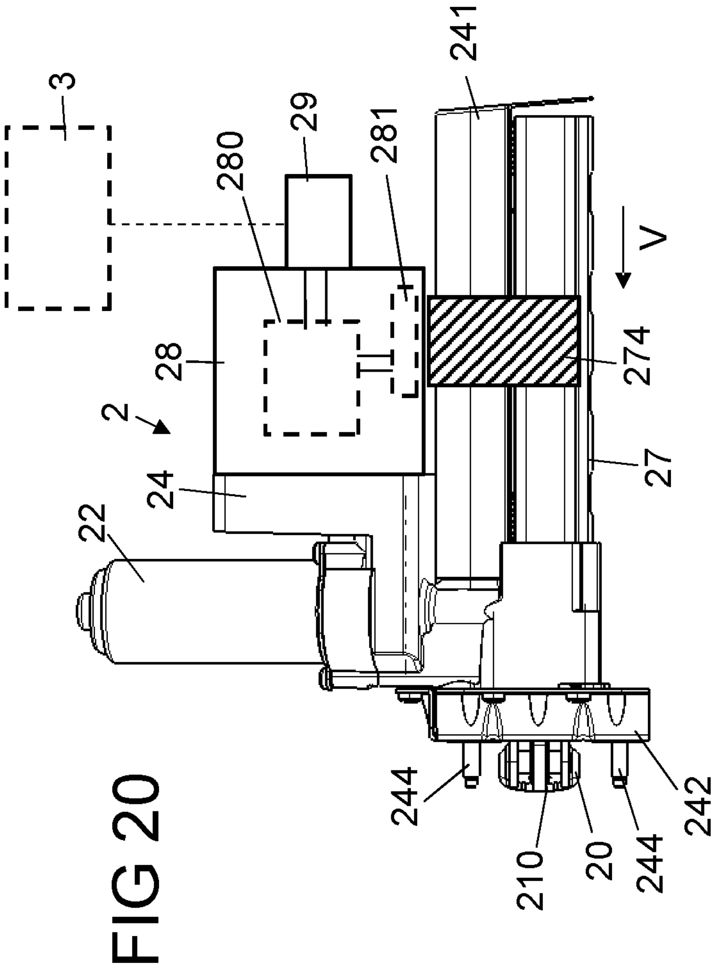
FIG. 20 is a view of an exemplary embodiment having a sensor apparatus for detecting a change in position between a gear housing and a guide rail for guiding a sliding element.

In order to measure the force in the force flow between the vehicle door 11 and the vehicle body 10 as part of a servo function, for example, in the exemplary embodiment according to FIG. 20, a sensor apparatus 28 is provided which serves to measure a change in position of the guide rail 27 (which is a component of the gear assembly of the drive motor 2) relative to the gear housing 24. For this purpose, the sensor apparatus 28 is arranged to be stationary on the gear housing 24 and comprises a coil 281 which is connected to an evaluation unit 280 in the form of an inductance-to-digital converter (LDC). The evaluation unit 280 is in turn connected to a control unit 3, which can be formed internally on the drive motor 2 or is coupled to the drive motor 2 by means of a plug connector 29 as an external control unit.

The coil 281 is arranged to be stationary on the gear housing 24 and is associated with a counter element 274 in the form of an electrically conductive panel element on the guide rail 27. When the guide rail 27 moves, the counter element 274 is deflected together with the guide rail 27 and is moved relative to the coil 281 as a result, which results in a change in inductance at the coil 281, which can be evaluated by the evaluation unit 280 and indicates a change in position of the guide rail 27 relative to the gear housing 24.

In operation, a force is exerted on the sliding element 26 in particular in the adjustment direction V by means of the adjustment part 21. Here, the coupling element 266 establishes the coupling to the adjustment part 21 and is vertically arranged at a distance from the spindle 25 in a vertical direction such that a force acts on the sliding element 26 (approximately) in parallel with the spindle 25, but so as to be vertically offset from the spindle 25. Owing to this application of force, an adjustment movement results in (slight) tilting of the sliding element 26 relative to the spindle 25 and thus in a change in position of the guide rail 27 in particular in the vertical direction relative to the gear housing 24.

This change in position can be detected by the sensor apparatus 28. Here, the change in position is correlated with the force in the force flow between the vehicle door 11 and the vehicle body 10 such that, on the basis of the change in position, a conclusion can be drawn on the force in the force flow, for example on the basis of a suitable calibration.

Sensor signals from the sensor apparatus 28 can be accordingly evaluated by the control apparatus 3 and can be used for regulating the drive motor 22, for example for providing a motor-assisted adjustment force as part of a servo function.

In the exemplary embodiment according to FIG. 20, the guide rail 27 is resiliently adjustable, in particular in the vertical direction relative to the gear housing 24 on which the sensor apparatus 28 is rigidly arranged. The guide rail 27 is connected to the gear housing 24 and the adapter element 242 at its end-face front end, but is not fixed to the gear housing 24 at a remote, rear end, such that the guide rail 27 can be deflected in the manner of a bending beam relative to the gear housing 20 when under load.

Figure 21:
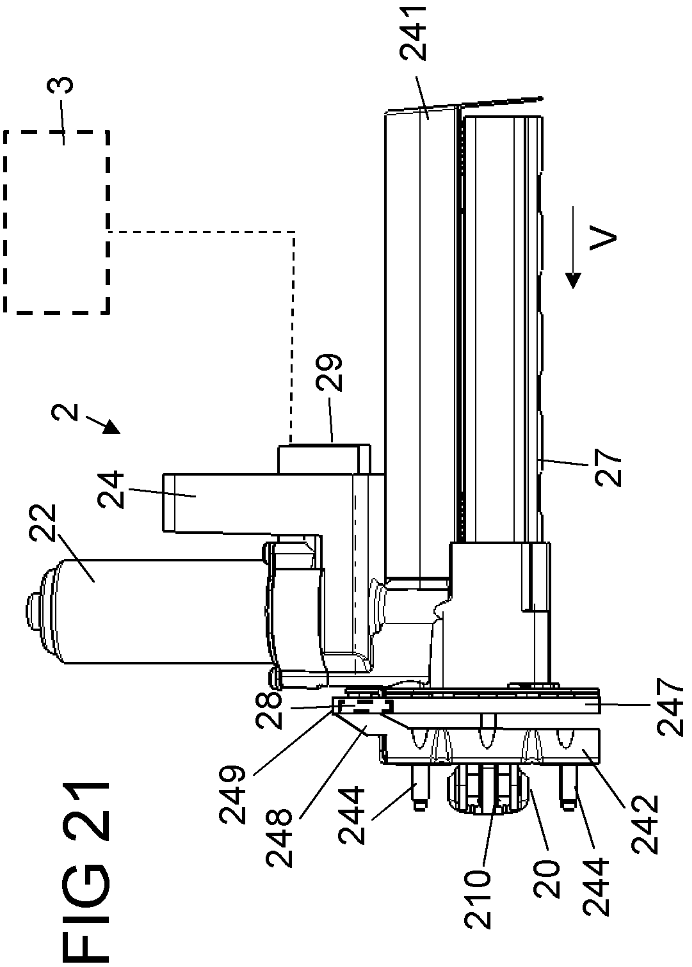
FIG. 21 is a view of an exemplary embodiment having a sensor apparatus for detecting a change in position at an adapter element, by means of which the drive device can be fixed to a vehicle door.

In another exemplary embodiment shown in FIG. 21, in a modification to the previously described exemplary embodiments, the adapter element 242 is connected to a connection element 247 in the manner of a bending beam. The connection element 247 is a component of the gear housing 24 and is rigidly connected to a housing portion of the gear housing 24. A connection of the gear housing 24 to the adapter element 242 is thus produced by the connection element 247.

In the exemplary embodiment according to FIG. 21, the adapter element 242 comprises a first end 248 and the connection element 247 comprises a second end 249. The ends 248, 249 of the adapter element 242 and the connection element 247 are connected for conjoint rotation, for example by a rivet element or a screw, such that the connection element 247 is clamped to the adapter element 242, but can be deflected here under elastic deformation relative to the adapter element 242.

For instance, the adapter element 242 and the connection element 247 each extend in parallel with one another transversely to the adjustment direction V, wherein the connection between the adapter element 242 and the connection element 247 only is produced by the ends 248, 249 and the connection element 247 comprising the gear housing 24 arranged thereon can thus be deflected approximately in the adjustment direction V relative to the adapter element 242.

A defined bend line can be formed on the adapter element 242 and/or the connection element 247 for example by a thinned material portion in order for the adapter element 242 and the connection element 247 to be deflected relative to one another.

In the exemplary embodiment according to FIG. 21, a sensor apparatus 28 in the form of one or more strain gauges is arranged on the adapter element 242 and/or the connection element 247, for example in a transition region between the adapter element 242 and the connection element 247, in order to detect a deformation at the adapter element 242 and/or the connection element 247 and to thus make a force measurement possible. Sensor signals from the sensor apparatus 28 are supplied to an internal or external control apparatus 3, which evaluates the signals and thus determines a force in the force flow of the drive device 2.

Because the sensor apparatus 28 is integrated directly in the door drive device 2 both in the exemplary embodiment according to FIG. 20 and in the exemplary embodiment according to FIG. 21, the sensor apparatus 28 does not contribute to the installation space in the drive device 2, or at least only contributes to it to a negligible extent. The sensor apparatus 28 allows for a reliable, precise force measurement in the force flow while requiring only a small amount of additional installation space in the drive device 2.

The concept underlying the solution is not limited to the exemplary embodiments previously set out, but can also be implemented in completely different kinds of embodiments.

A door drive device of the kind described can in particular be used on a vehicle side door as well as on a tailgate. A door drive device of the kind described can for example also be used to adjust a bonnet or a so-called frunk (i.e. a lid of a front luggage space of a vehicle), which should also be understood to mean vehicle doors in the context of the present text.

LIST OF REFERENCE NUMERALS

1 Vehicle
10 Body
11 Vehicle door
110 Door interior space
111 Door hinge

2 Door drive device
20 Joint
200 Joint pin
21 Adjustment part (thrust element)
210, 211 End
22 Drive motor
220 Motor shaft
221 Worm gear
23 Gear
230 Gear wheel
231 Bearing
232 Bearing bush
233 Shaft
234 Bearing
24 Gear housing
240 Bearing opening
241 Cover element
242 Adapter element
242A Opening
243, 244 Fastening element
245 Portion
246 Receiving opening
247 Connection element
248, 249 End
25 Spindle
250 Portion
251 Threaded portion
26 Sliding element
260 Structural part
261 Base
262 Leg
263 Sliding portion
264 Spindle nut portion
265 Threaded opening
266 Coupling element
267 Edges
268 Upright portion
27 Guide rail
270 Base
271 Leg
272 Edges
273 Flange portion
274 Counter element (electrically conductive panel element)
28 Sensor apparatus
280 Evaluation unit
281 Coil
29 Plug connector
3 Control apparatus
D Rotational axis
G Joint axis
L Longitudinal axis
Opening direction
V Adjustment direction

The invention claimed is:

1. A door drive device for adjusting a vehicle door relative to a vehicle body, comprising:

an adjustment part, which is movable along an adjustment direction, for transmitting force between the vehicle door and the vehicle body, a drive motor, a gear assembly which couples the drive motor to the adjustment part, a gear housing which at least partially encloses the gear assembly, an adapter element connected to the gear housing and configured for fastening the door drive device to the vehicle door or the vehicle body, wherein the adapter element comprises an opening through which the adjustment part extends and in which the adjustment part is movable along the adjustment direction, a sensor apparatus for determining a measured value which indicates a force between the vehicle door and the vehicle body, wherein the gear assembly comprises a guide rail that is connected to the gear housing and a sliding element that is guided on the guide rail longitudinally along the adjustment direction, wherein the sliding element is adjustable by means of the drive motor and is coupled to the adjustment part, wherein the gear assembly comprises a spindle that is rotatable about a rotational axis and is drivable by the drive motor, wherein the sliding element is in a threaded connection with the spindle and is adjustable, for moving the adjustment part, longitudinally along the adjustment direction by rotating the spindle, wherein the sensor apparatus is configured to detect a change in position between the gear housing and the adapter element or between the gear housing and the guide rail in order to determine the measured value.

2. The door drive device according to claim 1, wherein the gear housing comprises a connection element which is connected to the adapter element, wherein the sensor apparatus is configured to detect a change in position between the connection element and the adapter element in order to determine the measured value.

3. The door drive device according to claim 2, wherein the adapter element comprises a first end and the connection element comprises a second end, wherein the first end and the second end are interconnected.

4. The door drive device according to claim 3, wherein the first end and the second end are rotationally fixed to one another.

5. The door drive device according to claim 2, wherein the adapter element and the connection element extend in parallel with one another, and their position relative to one another is resiliently variable under the action of force.

6. The door drive device according to claim 1, wherein the guide rail is resiliently movable relative to the gear housing transversely to the adjustment direction.

7. The door drive device according to claim 1, wherein the adapter element is arranged on the end face of the guide rail.

8. The door drive device according to claim 1, wherein the adapter element extends transversely to the adjustment direction.

9. The door drive device according to claim 1, wherein the sliding element comprises a spindle nut portion having a threaded opening formed thereon, wherein the spindle engages in the threaded opening.

10. The door drive device according to claim 1, wherein the gear assembly comprises a gear wheel mounted on the gear housing for transmitting force from the drive motor to the spindle.

11. The door drive device according to claim 1, wherein the sensor apparatus comprises a strain gauge, an electrical coil or a piezoelectric sensor for detecting the change in position.

* * * * *